Figure 1:
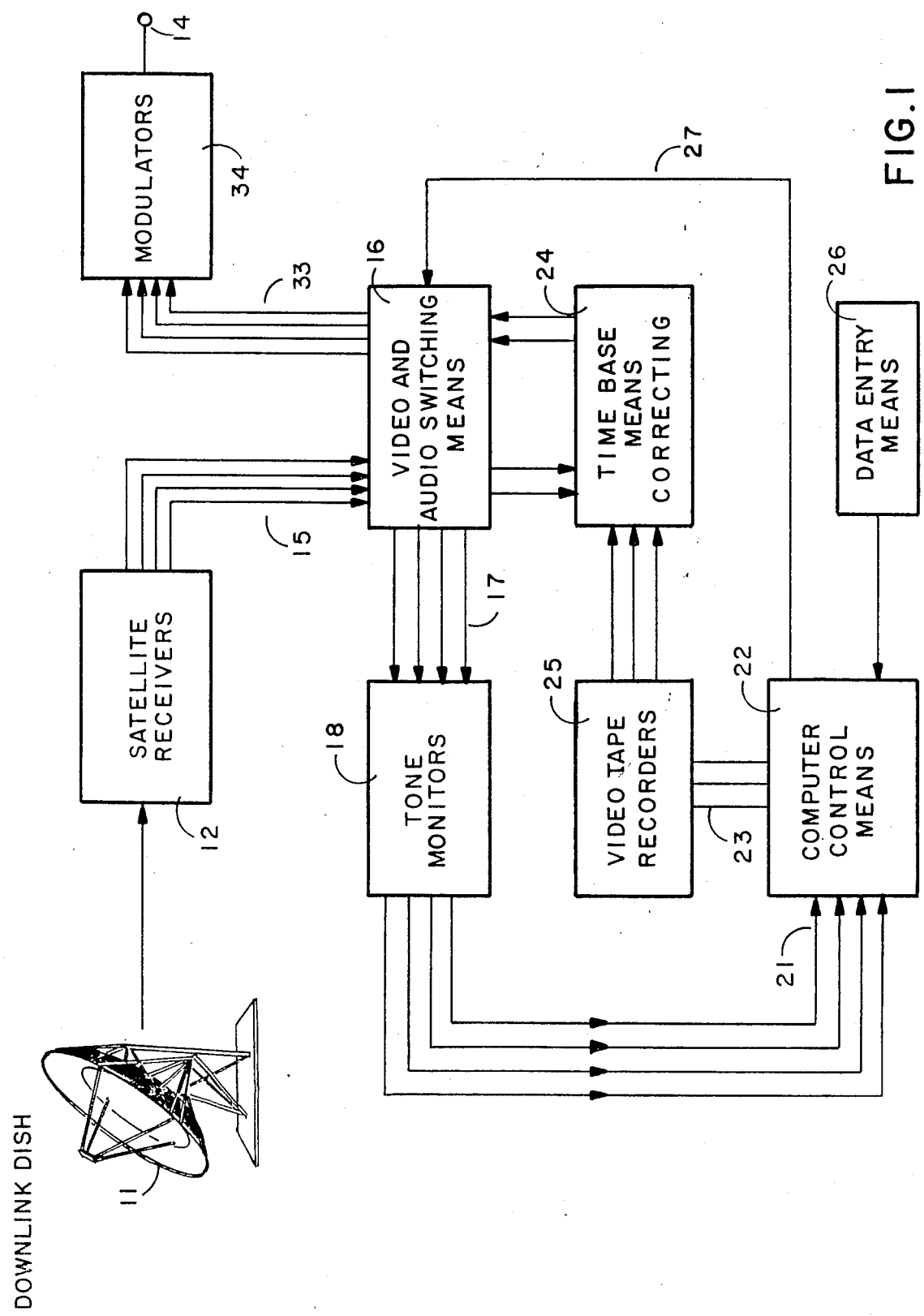

United States Patent [19]

Lambert

[11] Patent Number: 4,724,491

[45] Date of Patent: Feb. 9, 1988

[54] INSERTING TELEVISION ADVERTISING SPOTS AUTOMATICALLY

[75] Inventor: Trevor Lambert, Sherborn, Mass.

[73] Assignee: Adams-Russell Co., Inc., Waltham, Mass.

[21] Appl. No.: 645,117

[22] Filed: Aug. 28, 1984

[51] Int. Cl.$^4$ ...................... H04N 9/491; H04N 5/782
[52] U.S. Cl. ...................... 358/310; 358/11; 358/86; 360/14.1; 360/14.2
[58] Field of Search ................ 358/335, 310, 311, 86; 455/2–5; 360/13, 14.1, 14.2

[56] References Cited

U.S. PATENT DOCUMENTS 4,331,974  5/1982  Cogswell et al. .................... 358/86
4,404,589  9/1983  Wright, Jr. ........................... 358/86

*Primary Examiner*—Robert L. Richardson
*Attorney, Agent, or Firm*—Charles Hieken

[57] ABSTRACT

A downlink dish receives television signals from a remote location transmitted by satellite. Satellite receivers demodulate these received signals and normally transmit them through a switch to modulators which modulate respective carrier signals to retransmit the remote program video signals over a cable to subscribers. The switch also transmits the demodulated signals to tone monitors that detect a tone indicating the beginning of a spot message interval. A computer control responds to these detected signals to enable one or more video tape machines to deliver recorded spot messages to a time base corrector that also receives portions of the program video signal adjacent the spot message interval from the switch. The time base corrector delivers the time-base-corrected video signals through the switch to the modulators for modulating a selected carrier signal with program video signals and spot message signals without flicker. The computer control also enables tape monitors to record the spot messages when they are transmitted with information on the time and channel of transmission in support of billing. A data entry means furnishes information signals to the computer control for properly scheduling the rescheduling the transmission of spot messages.

7 Claims, 2 Drawing Figures

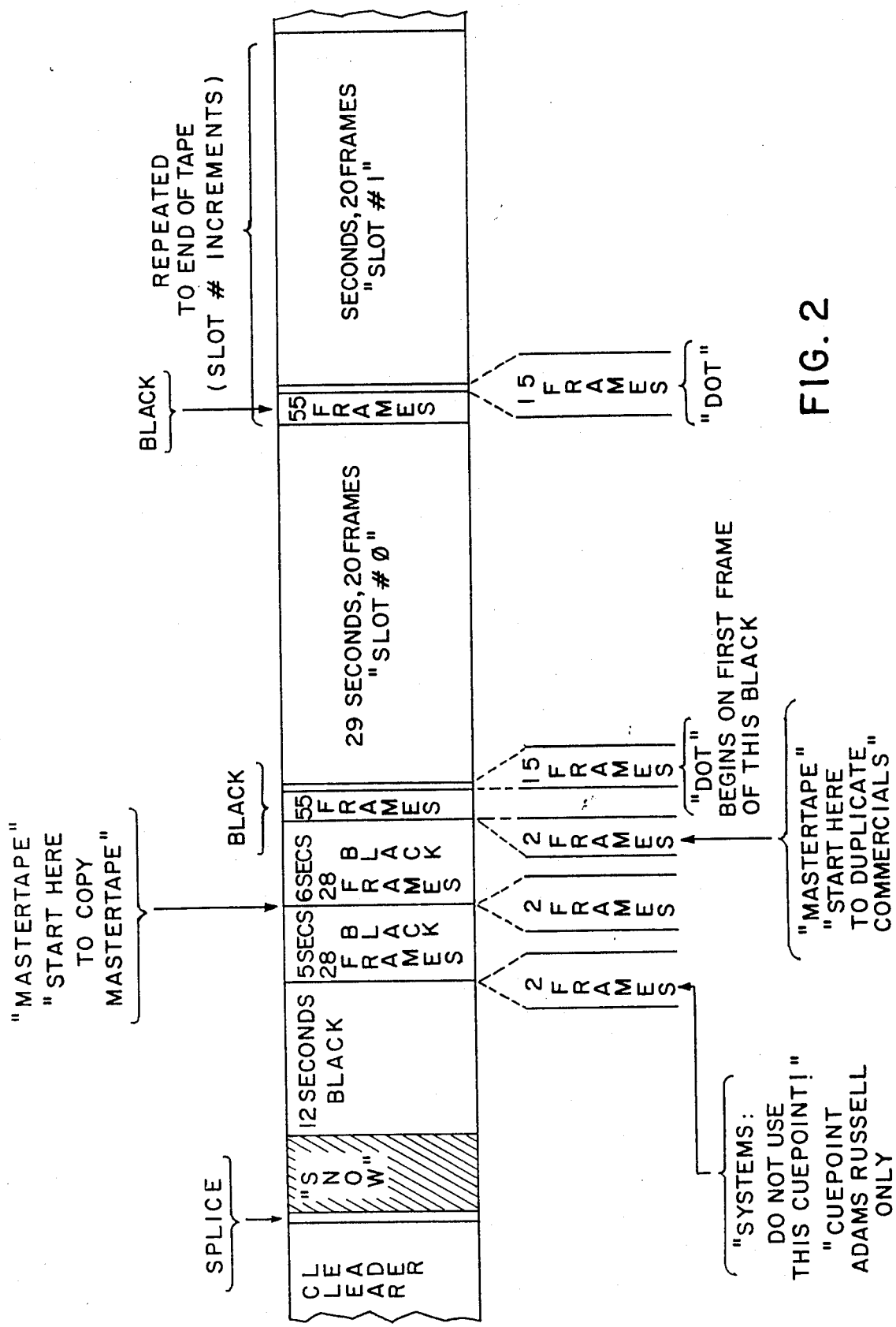

INSERTING TELEVISION ADVERTISING SPOTS AUTOMATICALLY

The present invention relates in general to automatically inserting spot transmissions in television programming and more particularly concerns novel apparatus and techniques for facilitating the automatic insertion of spot messages and making accommodations for schedule changes without the presence of a human operator.

A typical prior art advertising insertion system for television cable systems allows cable operators to insert television advertising messages into satellite-delivered programs by automatically detecting audio tones on the satellite-delivered program to switch in a magnetic tape video player that contains advertiser commercial messages. The prior art systems need an operator on duty to resolve changes in schedule, malfunctioning tape machines and changes of commercial messages. In addition, there is much labor required in preparation of schedules or trafficing and video editing.

It is an important object of this invention to provide improved apparatus and techniques for automatically inserting spot messages into television programming.

According to the invention, in a television system receiving program material from a remote location providing spot signals representative of an interval in which the television program signal from the remote source is to be interrupted for inserting spot messages at the local location, there is computer means for determining the program schedule responsive to the occurrence of said spot signals for causing recorded spot messages to be transmitted in accordance with the schedule during each remote program interruption interval and responsive to the real time occurrence of the spot signals for changing the program schedule in real time to match the changes in the actual transmitted program material provided from the remote location. The computer means receives information through means such as a keyboard on how many messages are to be run and on which networks and in which time bands, and processes this information to provide a detailed schedule for transmitting the spot messages in accordance with the schedule. If the network programs from the remote location fail to meet predetermined schedules, due to live programming constraints, such as occurs in sporting events or news coverage or for other reasons, then the computer means reschedules the spot messages by delaying their transmission to conform with a delayed spot message interval and/or cancelling one or more spot messages and/or rescheduling one or more spot messages into different time slots.

In a preferred form of the invention, the system includes a plurality of video tape recorders each carrying all possible spot messages with at least one preferably pre-positioned for the next scheduled event. The control computer means preferably switches a selected video tape recorder to modulating means for modulating a carrier signal with video information through time base corrector means for allowing a smooth transition between the program material from the remote location and the spot message to be transmitted during the spot message interval.

According to another feature of the invention that reduces the support editing time, there is means defining a master video magnetic tape. The master tape has recorded thereon the color black, including vertical and horizontal synchronization pulses and preferably color burst on the entire tape along with the Society of Motion Picture and Television Engineers (SMPTE) longitudinal time code with a frame accurate video signal thereafter recorded to create a number of precisely located black intervals that may be duplicated on an ordinary video tape recording machine. This approach allows editors to simply add new spot messages precisely located in the black intervals without the need for expensive SMPTE editing equipment.

Numerous other features, objects and advantages of the invention will become apparent from the following specification when read in connection with the accompanying drawing in which:

FIG. 1 is a block diagram illustrating the logical arrangement of a system according to the invention; and FIG. 2 illustrates a typical format for a master video tape according to the invention.

With reference now to the drawing and more particularly FIG. 1 thereof, there is shown a block diagram illustrating the logical arrangement of a system according to the invention. Television program signals from a remote location are received from a satellite by means including downlink dish 11 and satellite receivers 12, and retransmitted by the source of modulated carrier signals on cable output 14. Satellite receivers 12 deliver the demodulated remote program video signals on lines 15 to switching means 16 that delivers these video signals over lines 17 to tone monitors 18 that provide a spot signal over lines 21 to computer control means 22 to indicate that an associated program is available for interruption for a local spot message interval, typically two minutes. Computer control means 22 provides spot message selection signals on line 27 to video and audio switching means 16 and on line 23 to video tape machines 25. Computer control means 22 receives schedule information signals from data entry means 26. Time base means 24 provides either remote program video or local spot message video signals to switching means 16. Switching means 16 provides remote program video and/or spot message video signals on lines 33 to modulators 34 to provide modulated carrier signals on cable 14 for transmission to subscribers at remote locations.

Having described the physical arrangement of the system, its mode of operation will be described. Downlink dish 11 receives the remote program signals from a satellite, and satellite receivers 12 demodulate the different program video signals, typically four, although there may be more or less. It is also within the principles of the invention to receive the remote program video signals through other means, such as telephone coaxial cable, fiberoptic circuits or microwave links. The demodulated program video signals on lines 15 are normally coupled by switching means 16 directly to corresponding output lines 33 when providing remote program video signals to modulators 34 for modulating respective carriers to retransmit the different remote program video signals over respective cable channels on cable 14 for transmission to subscribers.

Switching means 16 also provides the received demodulated remote program video signals to respective tone monitors 18. When a tone monitor 18 detects a spot message signal carried in a remote program video signal to signify the start of a spot message interval, a spot message signal is delivered over a respective line 21 to computer control means 22. Computer control means 22 responds by providing a number of control signals on lines 23 and 27. The control signal on line 27 enables switching means 16 to switch the last frame from the associated program video signal to time base means 24 ahead of the spot video message signal to be transmitted in the spot message interval. Control signals on lines 23 select a particular video tape machine and a particular spot message there stored for transfer to time base means 24 for delivery to switching means 16 following the last frame of the remote program video signal prior to start of the spot message interval. Switching means 16 then delivers this train of signals on the appropriate one of lines 33 to modulators 34 for modulating a corresponding carrier signal that is provided on output cable 14.

A feature of the invention is that all spot messages desired to be inserted may be recorded on each of the video tape machines 25. Computer control means 22 has random access to all video tape machines and therefore all video messages. The computer control may select a particular collection of spot messages for each spot message interval, or program break, in accordance with information received from data entry means 26. When all programming is on schedule, computer control means 22 may effect this transmission of spot messages in accordance with initially entered data. When predetermined schedules are not met, such as during a sporting event or live news coverage, computer control means 22 may revise the schedule in a manner which merely involves delaying a preselected group of spot messages, or selecting a different group in accordance with appropriate information signals received from data entry means 26.

The specific techniques for entering the data and programming computer control means 22 are within the skill of those having ordinary skill in the art and are not described in detail herein to avoid obscuring the principles of the invention. Computer control means 22 may comprise a personal computer, such as a commercially available Apple IIe personal computer.

Time base correcting means 24 allows a smooth transition between the programming and the inserted spot messages and typically may comprise a commercially available 410 TBC time base corrector.

Computer control means 22 allows for multiple levels of operation so that is may also select a second spot message for transmission concurrently with the first-selected spot message stored in a second video tape machines 25 for transmission over another channel.

An advantageous aspect of the invention is that it allows short sport messages to be stored as individual messages on the tape in the video tape machines 25. In real time the system broadcasts a sequence of short spot messages into a program break, typically two minutes. Computer control means 22 may designate a desired sequence of these short spot messages into a two minute break automatically in real time. This approach avoids scheduling and editing labor to prepare two-minute breaks in advance. In the prior art a complete two-minute segment of spot messages is normally assembled on a tape. The invention allows individual spot messages to be entered only once. Computer control means 22 may then assemble the individual messages into two-minute breaks in real time when ready for transmission.

Another feature of the invention resides in ease of assembling for transmission any sequence of spot messages and enhanced reliability by using a plurality of video tape machines 25.

Computer control means 22 may also be arranged for automatically printing customer invoices based on the actual schedule run of spot commercial messages.

A feature of the invention is the provision of a master tape with precisely oriented slots that can be duplicated on a conventional video tape recording machine to enable transfer of spot messages into the slots with conventional apparatus without requiring precision timing equipment.

The procedure for creating a master tape follows:

On a new unrecorded ¾" 60 minute video-cassette leave 8 seconds of "snow" (unrecorded videotape—not to be confused with clear leader) at the beginning of the tape.

Then record "color black"—including vertical and horizontal synchronization pulses and "colorburst-"—on the entire tape while simultaneously recording Society of Motion Picture and Television Engineers (SMPTE) Longitudinal Time Code (LTC) on the second audio channel. This procedure preferably uses non-drop frame type SMPTE LTC.

After completion of the recording procedure outlined above, the following procedure is applied:

Using SMPTE LTC editing equipment responsive to the SMPTE LTC recorded on the audio channel, such as the commercially available Control Video Corporation "Light-finger" editing equipment, insert frame accurate video as shown in FIG. 2 to denote one position on the tape of each spot message.

The initial frame indentification "dot" and all textual information, which may include Adams-Russell logos, are created with character generation equipment, such as a Chyron VP-1 character generator with custom Adams-Russell logos.

The procedure for duplicating the master tape as thus recorded follows.

On a new unrecorded ¾" 60 minute videocassette leave 8 seconds of "snow" (unrecorded videotape—not to be confused with clear leader) at the beginning of the tape. PUT RECORD VCR IN "PLAY" AND "PAUSE" AT THIS LOCATION.

Cue up the playback VCR to the first full frame of "CUEPOINT ADAMS (logo) RUSSELL ONLY". PUT PLAYBACK VCR IN "PLAY" AND "PAUSE" AT THIS LOCATION.

Simultaneously PUT THE PLAYBACK VCR IN "PLAY" AND THE RECORDING VCR IN "RECORD" AND "PLAY".

Tape from record machine is finished product when tape machines automatically rewind at end of recording process.

The procedure for inserting spots into the slots in the copied master tape follows:

Each spot message "in" (or starting) point should be ten frames past the first frame bearing the "dot" at its allocated spot location as observed on a television monitor displaying the video recorded on the copied master tape. A 60-minute tape may typically accommodate 30-second spots, each in a numbered location that may be readily detected with techniques well-known in the art to create a spot message master.

This spot message master may then be duplicated as follows:

On a new unrecorded ¾" 60 minute videocassette leave 8 seconds of "snow" (unrecorded videotape—not to be confused with clear leader) at the beginning of the tape. PUT RECORD VCR IN "PLAY" AND "PAUSE" AT THIS LOCATION.

Cue up the playback VCR to the first full frame bearing a prompting message such as "START HERE TO DUPLICATE COMMERCIALS".

Simultaneously PUT THE PLAYBACK VCR IN "PLAY" AND THE RECORDING VCR IN "RECORD" AND "PLAY".

Tape from record machine is finished product when tape machines automatically rewind at end of recording process.

FIG. 2 illustrates a typical format for a master tape setting forth the formatting of the frames in terms of frames, seconds and/or seconds plus frames.

The advantage of this arrangement is that the frames in the original master tape are precisely located with the aid of precision equipment. This master may then be duplicated to create other spot message masters which may be duplicated on conventionl video-recording machines while maintaining the established precise alignments. Spot messages may then be inserted in the numbered slots of the duplicated master tapes with black slots. These master spot message tapes may then be duplicated and placed on respective ones of the video tape machines 25. Now prior to the next spot message, computer control 22 may designate any of the stored messages in any order for transmission during the time slot for local messages by commanding selected ones of the tape machines to advance or rewind to the beginning of a designated slot location and then enable that machine when the selected spot message is designated for transmission. The specific techniques for positioning the tapes at respective slots and enabling the respective machines are well-known in the art, not a part of the invention and not described in detail herein to avoid obscuring the principles of the invention.

Data entry means 26, typically a keyboard, may be used in a conventional manner to enter information designating spot messages, assigning a priority to each spot message and information on when and the number of times a spot message is to be run. The specific techniques for establishing these schedules are within the skill of a programmer of ordinary skill and are embodied in the commercially available ARVIS-7000 spot message system incorporated by reference herein.

There has been described novel apparatus and techniques for automatically inserting spot messages into a television transmitting system incorporating program signals from a remote location. It is evident that those skilled in the art may now make numerous uses and modifications of and departures from the specific apparatus and techinques disclosed herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. In a television transmitting system for retransmitting program video signals from a remote location having spot signals to indicate the beginning of a spot message interval in which the remote video program signal is interrupted for allowing local transmission of spot message video signals the improvement comprising, spot message storage means for storing a plurality of spot messages for transmission during spot message intervals, computer control means responsive to said spot message start signals for selectively transferring a predetermined sequence of said stored spot messages for transmission during a spot message interval, said computer control means comprising means for rescheduling transmission of sequences of said stored spot messages in response to spot signals occurring at times different from prescheduled times entered in said computer control means for effecting insertion of said recorded spot messages in spot message intervals in accordance with a new schedule.

2. The improvement in accordance with claim 1 wherein said spot message storage means comprises a plurality of video tape machines each having a video tape recording of all selectable spot messages for transmission in the same order whereby said computer control means may select any spot message from any of said video tape machines and ready a sequence of spot messages for transmission during a future spot message interval by identifying a particular one of said video tape machines to provide a particular spot message signal during said next spot message interval and provide address signals so that each video tape machine selected to provide a spot message signal during the next spot message interval may move the video tape recording thereon to a position with the start of the selected spot message for that video tape machine positioned for being read out immediately upon selection by said computer control means during said next spot message interval.

3. A method of creating a master spot message tape on a video tape recording machine which method includes the steps of, leaving an interval of unrecorded video tape for a predetermined length at the beginning of the tape to create a snow interval thereon, recording color black including television synchronization signals while simultaneously recording on a predetermined audio channel a predetermined longitudinal time code, thereafter inserting frame-accurate video signals with longitudinal time code editing equipment responsive to the predetermined longitudinal time code recorded on said predetermined longitudinal time code recorded on said predetermined audio channel to create a plurality of message slots each comprising a sequence of black frames with said recorded video synchronization signals the first of which carries a predetermined signal identifying the beginning of the slot.

4. A method of creating a master tape in accordance with claim 3 wherein said step of recording color black with television synchronization signals includes recording vertical and horizontal synchronization pulses and the color burst synchronizing signal.

5. A method for duplicating the master tape created by the method of claim 3 which method includes the steps of, placing said master tape on a video tape playback machine, placing an unrecorded video tape on a video tape recording machine, creating an initial unrecorded interval on said unrecorded tape for said predetermined initial length and at this location putting said recording video tape machine in both the play and pause condition, simultaneously putting the playback video tape machine in play while placing the recording video tape machine in both record and play period to create a copied master tape in said recording video tape machine.

6. A method of inserting spots into the slots of a master tape having the slots of the master tapes of claim 5 which method includes the steps of placing a master tape on a recording video tape machine, playing back the master tape thereon and observing the video picture produced thereby on a television picture tube to identify the first frame of a message slot by observing said predetermined reference signal, and commencing recording a message spot signal a predetermined number of frames after said first frame and repeating the previous steps until a plurality of spot messages are recorded thereon, the total time interval of said spot messages recorded in said slots being greater than said predetermined spot time interval.

7. A method in accordance with claim 6 and further including the step of duplicating the spot message tape created in accordance with the method of claim 6.

* * * * *